United States Patent
Huseth et al.

(10) Patent No.: US 7,830,250 B2
(45) Date of Patent: Nov. 9, 2010

(54) APPARATUS AND METHOD FOR LOCATION ESTIMATION USING POWER SUPPLY VOLTAGE LEVELS OF SIGNAL TRANSMITTERS

(75) Inventors: Steve D. Huseth, Plymouth, MN (US); Hai D. Pham, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 261 days.

(21) Appl. No.: 11/977,113

(22) Filed: Oct. 22, 2007

(65) Prior Publication Data

US 2009/0102642 A1 Apr. 23, 2009

(51) Int. Cl.
*G08B 1/08* (2006.01)

(52) U.S. Cl. .............. 340/539.13; 340/539.11; 340/539.1; 340/531; 340/500; 455/456.1; 342/450

(58) Field of Classification Search ............ 340/539.13, 340/539.11, 539.1, 531, 500; 342/450; 455/456.1
See application file for complete search history.

(56) References Cited

U.S. PATENT DOCUMENTS

| 5,412,388 | A | 5/1995 | Attwood | |
|---|---|---|---|---|
| 6,792,383 | B2 * | 9/2004 | Brouillard et al. | ........... 702/158 |
| 7,205,938 | B2 | 4/2007 | Davi et al. | |
| 2003/0153331 | A1 | 8/2003 | Alger | |
| 2004/0147269 | A1 | 7/2004 | Kim | |
| 2005/0032526 | A1 | 2/2005 | Chen et al. | |
| 2006/0055552 | A1 * | 3/2006 | Chung et al. | ............. 340/686.1 |
| 2007/0132577 | A1 * | 6/2007 | Kolavennu | ............. 340/539.13 |

FOREIGN PATENT DOCUMENTS

WO WO 98/10307 A1 3/1998

OTHER PUBLICATIONS

Amer Catovic et al., "Hybrid TOA/RSS and TDOA/RSS Location Estimating Schemes for Short-Range Wireless Networks", Bechtel Telecommunication Technical Journal, Sep. 2004, vol. 2, No. 2, 8 pages.

(Continued)

*Primary Examiner*—Brian A Zimmerman
*Assistant Examiner*—Kevin Lau
(74) *Attorney, Agent, or Firm*—Munck Carter, LLP

(57) ABSTRACT

Beacon generators transmit wireless beacon signals for use in tracking an object. Among other things, a wireless beacon signal from a particular beacon generator contains information identifying a power supply voltage associated with that beacon generator. A tracking device associated with the object receives one or more of the beacon signals. The tracking device measures the signal strength of a received beacon signal, and the tracking device identifies the power supply voltage associated with the beacon generator that transmitted the received beacon signal. The tracking device or an external component, such as a control unit, can use the identified signal strength and the identified power supply voltage to determine the location of the object. As a particular example, signal strengths and power supply voltages associated with at least three beacon signals can be used to identify the location of the object.

20 Claims, 6 Drawing Sheets

OTHER PUBLICATIONS

Kaveh Pahlavan et al., "Indoor Geolocation Science and Technology", IEEE Communications Magazine, Feb. 2002, pp. 112-118.

K. W. Cheung et al., "Least Squares Algorithms for Time-of-Arrival-Based Mobile Location", IEEE Transactions on Signal Processing, vol. 52, No. 4, Apr. 2004, pp. 1121-1128.

Jose A. Costa et al., "Achieving High-Accuracy Distributed Localization in Sensor Networks", 2005 IEEE, pp. 641-644.

Muzaffer Kanaan et al., "A comparison of wireless geolocation algorithms in the indoor environment", IEEE Communications Society, 2004, pp. 177-182.

* cited by examiner

APPARATUS AND METHOD FOR LOCATION ESTIMATION USING POWER SUPPLY VOLTAGE LEVELS OF SIGNAL TRANSMITTERS

CROSS-REFERENCE TO RELATED APPLICATIONS

This application is related to:

U.S. patent application Ser. No. 11/796,749 filed on Apr. 30, 2007; and

U.S. patent application Ser. No. 11/298,822 filed on Dec. 9, 2005.

Both of these applications are hereby incorporated by reference.

TECHNICAL FIELD

This disclosure relates generally to location estimation and more specifically to an apparatus and method for location estimation using power supply voltage levels of signal transmitters.

BACKGROUND

It is often desirable to determine the location and/or movement of a person or other object within a home, business, hospital, prison, or other area or space. For example, elderly or infirm persons living alone or in a nursing home may need frequent or even relatively constant monitoring by caregivers. As another example, firefighters and other first-responders in a risky environment, such as a burning building, may need to be tracked to increase or ensure their safety.

Various techniques have been used to determine the location and movement of persons or other objects, such as radar, Global Positioning System (GPS), Time-of-Flight, and Time-Difference-of-Arrival techniques. For example, radar techniques involve the reflection of electromagnetic radiation off a person or other object and may be used for tracking purposes. GPS techniques, where the person or other object is equipped with a GPS transmitter for transmitting signals that can be received by GPS satellites, may also be used for tracking purposes. However, these techniques require relatively expensive equipment and may not work effectively under certain circumstances. For instance, radar and GPS systems may not work effectively within a building because the walls and ceilings of the building can block radar signals or block access to GPS satellites.

Relatively less expensive radio techniques may also be used to determine the location and movement of a person or other object. For example, the power level of a radio signal typically attenuates at a logarithmic rate over distance. A radio receiver can receive a signal transmitted by a radio transmitter, measure the received signal's power level, and estimate a distance between the radio transmitter and the radio receiver. Using signals from several radio transmitters at different known locations, a mobile radio receiver could determine its location using triometric or multilateration calculations. However, approaches based on signal power attenuation often produce accurate location estimates only in a perfect world devoid of radio interference or physical objects, which can absorb or reflect radio signals. Also, since the power level of a radio signal attenuates at a logarithmic rate, the accuracy of the distance calculations in these techniques typically deteriorates exponentially as the signal power level decreases. As a result, the accuracy of the estimated location using these approaches can be significantly affected.

SUMMARY

This disclosure provides an apparatus and method for location estimation using power supply voltage levels of signal transmitters.

In a first embodiment, a method includes identifying a power supply voltage associated with a transmitter of a wireless signal. The method also includes identifying a signal strength associated with the wireless signal. The method further includes determining a position of an object using the identified power supply voltage and the identified signal strength.

In particular embodiments, determining the position of the object includes using a signal strength-to-distance mapping that associates signal strength values and distances values.

In other particular embodiments, the method also includes selecting the signal strength-to-distance mapping from among a plurality of mappings based on the power supply voltage.

In yet other particular embodiments, the method also includes modifying the signal strength-to-distance mapping based on the power supply voltage.

In still other particular embodiments, the method also includes modifying the identified signal strength based on the identified power supply voltage. Also, determining the position of the object includes using the modified signal strength and the signal strength-to-distance mapping.

In additional particular embodiments, a tracking device associated with the object determines the location of the object, or an external controller determines the location of the object based on information received from the tracking device.

In a second embodiment, an apparatus includes a memory configured to store information identifying a power supply voltage associated with a transmitter of a wireless signal and information identifying a signal strength associated with the wireless signal. The apparatus also includes a controller configured to determine a position of an object using the identified power supply voltage and the identified signal strength.

In a third embodiment, a computer program is embodied on a computer readable medium. The computer program includes computer readable program code for identifying a power supply voltage associated with a transmitter of a wireless signal. The computer program also includes computer readable program code for identifying a signal strength associated with the wireless signal. In addition, the computer program includes computer readable program code for determining a position of an object using the identified power supply voltage and the identified signal strength.

In a fourth embodiment, a method includes identifying a power supply voltage associated with a transmitter of a wireless signal. The method also includes transmitting a wireless signal containing information associated with the identified power supply voltage and information associated with a transmit power level of the transmitter for use in tracking a wireless device configured to receive the wireless signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
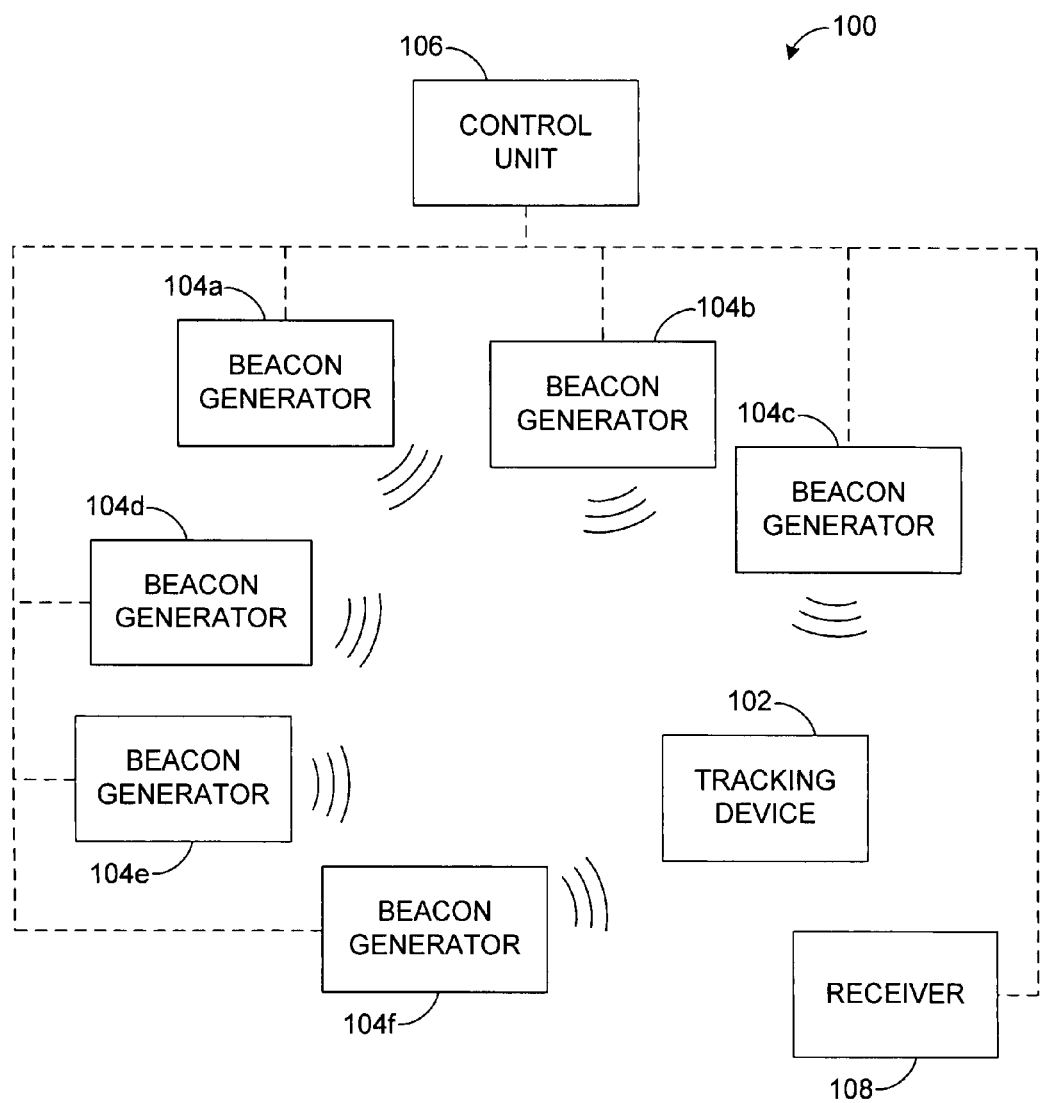
FIG. 1 illustrates an example location tracking system according to one embodiment of this disclosure.

FIG. 1 illustrates an example location tracking system 100 according to one embodiment of this disclosure. The embodiment of the location tracking system 100 shown in FIG. 1 is for illustration only. Other embodiments of the location tracking system could be used without departing from the scope of this disclosure.

As shown in FIG. 1, the location tracking system 100 includes a tracking device 102, multiple beacon generators 104a-104f, and a control unit 106. The location tracking system 100 generally operates to identify the location (or at least an estimated location) of the tracking device 102. For example, the location tracking system 100 could identify the location of the tracking device 102 in a building or other specified structure or area. The tracking device 102 could be attached to, placed on, or otherwise associated with an object. In this document, the term "object" refers to any physical entity or item to be tracked, such as a person, an animal, a vehicle, a piece or collection of electronic equipment, or any other object. Also, the terms "location" and "position" can be used interchangeably to refer to the area actually occupied by a tracking device or an object being tracked. In addition, the term "track" and its derivatives refer to the detection or identification of at least one location associated with a tracking device or an object being tracked. The term "track" and its derivatives may, but need not, encompass continuous or near-continuous detection or identification of the location associated with a tracking device or an object being tracked.

Figure 2:
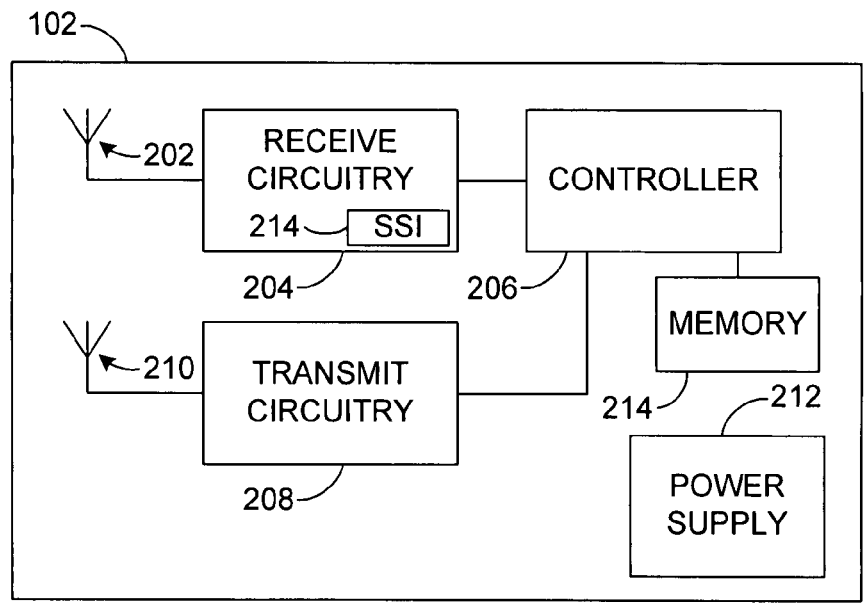
FIG. 2 illustrates an example tracking device in a location tracking system according to one embodiment of this disclosure.

In the example shown in FIG. 1, the tracking device 102 receives wireless signals (called beacon signals) from the beacon generators 104a-104f. The beacon signals transmitted to the tracking device 102 enable the tracking device 102 or other component to determine a location (or at least an estimated location) of the tracking device 102. For example, the tracking device 102 could represent a portable device capable of being carried by, attached to, or otherwise associated with a person or other object being tracked. The tracking device 102 could receive and process the beacon signals from the beacon generators 104a-104f as described below, which enables the tracking device 102 or other component to identify the location of the tracking device 102. The tracking device 102 includes any suitable structure for receiving beacon signals to enable identification of at least one location associated with the tracking device 102. One example embodiment of a tracking device is shown in FIG. 2, which is described below.

The beacon generators 104a-104f transmit the beacon signals to the tracking device 102, which allows the tracking device 102 or other component to identify a location of the tracking device 102. In some embodiments, the beacon generators 104a-104f are positioned at different known locations within a building or other structure or area in which an object is to be tracked. In particular embodiments, the beacon generators 104a-104f may remain stationary once installed. Each of the beacon generators 104a-104f includes any suitable structure for transmitting beacon signals to one or more tracking devices 102.

Figure 3:
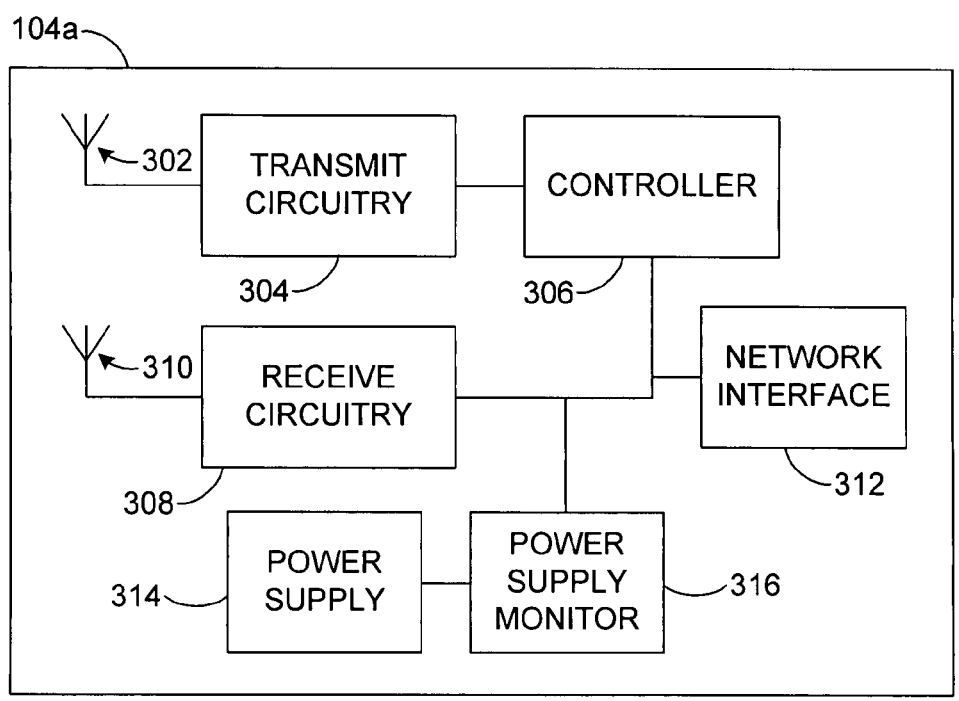
FIG. 3 illustrates an example beacon generator in a location tracking system according to one embodiment of this disclosure.

In some embodiments, the beacon generators 104a-104f represent transmitters placed in smoke, fire, carbon monoxide, or other detectors in a building or other structure or area. A particular embodiment of this type of beacon generator is disclosed in U.S. patent application Ser. No. 11/895,168 filed on Aug. 23, 2007, which is hereby incorporated by reference. In these embodiments, each of the beacon generators 104a-104f could include a printed circuit board that resides between a smoke, fire, carbon monoxide, or other detector and its base. Also, the printed circuit board could include contacts that allow the detector to communicate through the printed circuit board to wires at the detector's base. In this way, the beacon generators 104a-104f can be easily placed in residences, buildings, or other structures or areas having existing smoke, fire, carbon monoxide, or other detection systems already in place. Also, the beacon generators 104a-104f can be easily installed in a manner that hides them from view. However, any other or additional types of beacon generators could be used in the system 100. One example embodiment of a beacon generator is shown in FIG. 3, which is described below. The beacon generators 104a-104f and the tracking device 102 may or may not be at essentially the same elevation depending on the implementation, such as whether the system 100 is deployed in a single-floor structure or a multi-floor structure.

The tracking device 102 and the beacon generators 104a-104f may use any suitable wireless technology. For example, the tracking device 102 may receive radio frequency (RF) signals from the beacon generators 104a-104f. In some embodiments, the beacon generators 104a-104f could transmit RF beacon signals at one or multiple transmit power levels, such as transmit power levels of 0 dBm, −10 dBm, and −25 dBm. As described below, the beacon generators 104a-104f could insert information into the beacon signals identifying the transmit power used to transmit the beacon signals. In particular embodiments, a beacon generator could transmit different RF beacon signals simultaneously or in rapid succession (such as with a separation of 50 μs although the separation can vary, such as depending on whether a fast or slow moving object is being tracked). In these particular embodiments, each RF beacon signal could have a unique power level, such as when three RF beacon signals are transmitted having signal power levels of 0 dBm, −10 dBm, and −25 dBm, respectively. As described below, the system 100 may weight the beacon signals differently based on the transmit power levels of the beacon signals, which may help to improve the identification of the location of the tracking device 102 during location tracking.

The beacon signals transmitted by the beacon generators 104a-104f could include or be associated with any suitable information. For instance, each beacon signal transmitted by a beacon generator could include or be associated with an identifier identifying that beacon generator, such as a digital alphanumeric value, a particular RF frequency, or any other identifier representing the beacon generator. Each beacon signal could also include the transmit power level used by the beacon generator to transmit that beacon signal, such as a value identifying whether the beacon signal was transmitted at 0 dBm, −10 dBm, or −25 dBm. In addition, as described in more detail below, each beacon signal could include or identify the supply voltage used by the beacon generator transmitting that beacon signal. As described below, the signal strength of a beacon signal received from a beacon generator could vary depending on the supply voltage provided to the beacon generator. The inclusion of the supply voltage level in the beacon signal could allow the tracking device 102 or other component to take this into account when identifying the location of the tracking device 102.

The control unit 106 may perform various functions in the system 100. For example, the control unit 106 may be coupled to the beacon generators 104a-104f and control the transmission of beacon signals by the beacon generators 104a-104f. As particular examples, the control unit 106 could control the transmit power levels of the beacon generators 104a-104f and the interval between beacon signal transmissions by the beacon generators 104a-104f.

In some embodiments, the control unit 106 can also receive data from the tracking device 102, such as information associated with the position of the tracking device 102. In these embodiments, the control unit 106 could receive the data from the tracking device 102 via the beacon generators 104a-104f (which could act as transceivers to receive data as well as transmit the beacon signals) or via one or more separate receivers 108. As a particular example, the tracking device 102 could determine its position using the technique described below and transmit that position to the control unit 106. As another particular example, the tracking device 102 could identify information associated with a received beacon signal (such as a beacon generator identifier, transmit power level, and supply voltage level) and provide this information to the control unit 106, which can use this information to identify the location of the tracking device 102.

Figure 4:
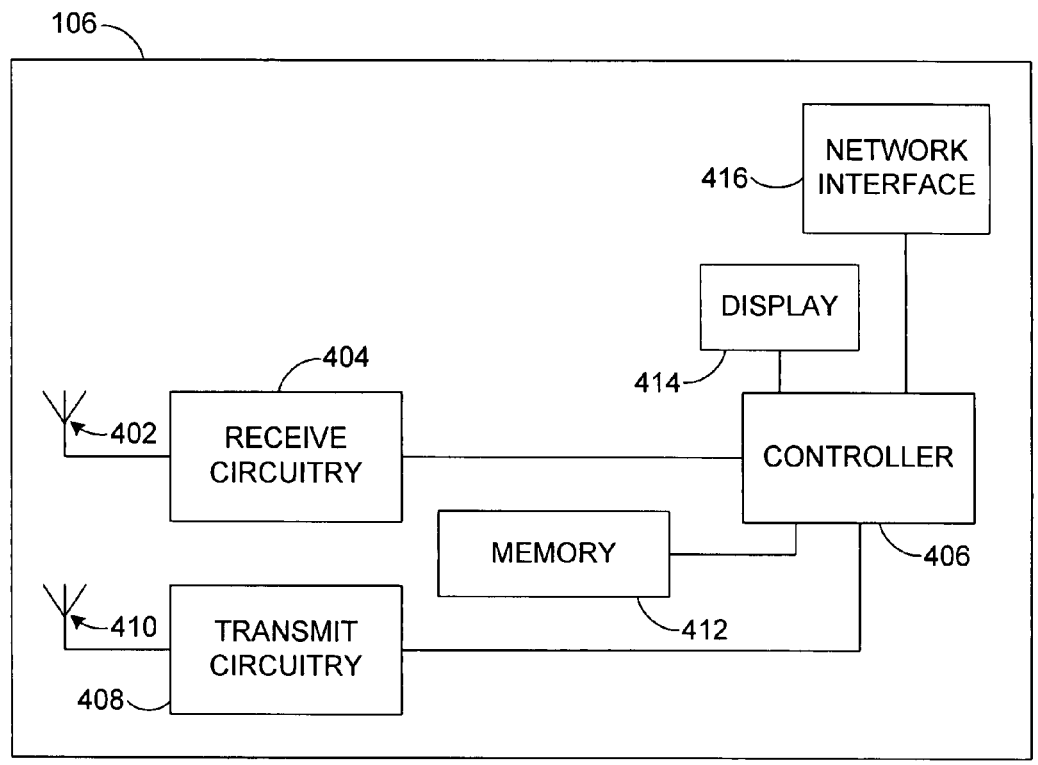
FIG. 4 illustrates an example control unit in a location tracking system according to one embodiment of this disclosure.
Figure 5:
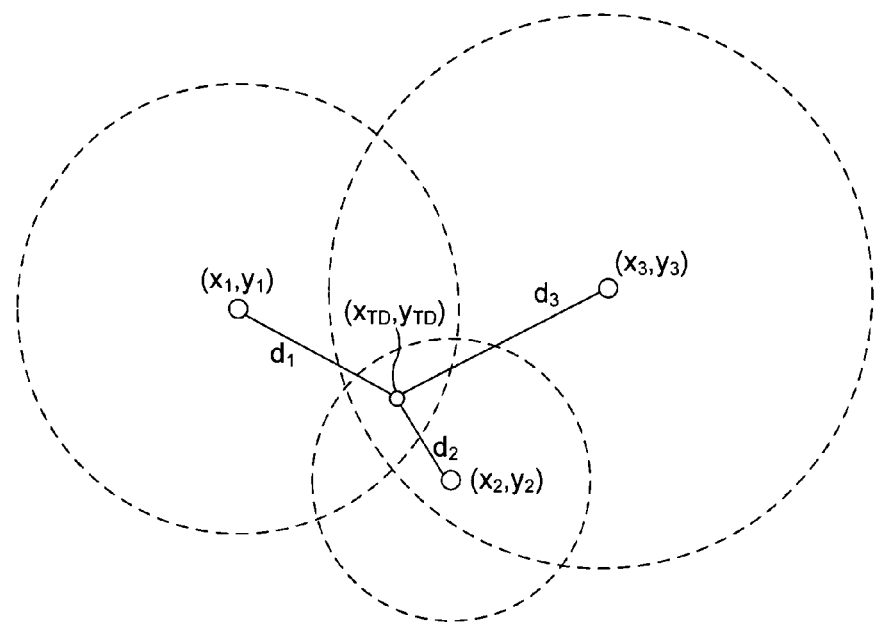
FIG. 5 illustrates an example calculation of a tracking device's position in a location tracking system according to one embodiment of this disclosure.

The control unit 106 could include any other or additional functionality. The control unit 106 includes any suitable structure for identifying or facilitating the identification of a location associated with the tracking device 102. The control unit 106 may, for example, include any suitable computing device(s), such as a microprocessor, personal computer, application specific integrated circuit (ASIC), state machine, processor, combinational logic, digital signal processor, and/or other hardware, software, firmware, or combination thereof. One example embodiment of a control unit is shown in FIG. 4, which is described below.

In some embodiments, to track the movement of an object, the tracking device 102 may periodically process received beacon signals from various ones of the beacon generators 104a-104f. The processing of the received wireless signals can be done at a constant or variable interval. The length of the time interval could vary, such as depending on the accuracy required. In particular embodiments, the length of the time interval is inversely proportional to the speed at which the tracking device 102 is or may be moving. For example, the time interval could be 0.5 seconds for tracking a firefight within a building and up to 1 minute for tracking a person at home. Also, the tracking device 102 could analyze all beacon signals that it can detect or a subset of the beacon signals that it can detect, such as all beacon signals having a signal strength over a threshold value.

The tracking device 102 can process the received beacon signals in any suitable manner to identify appropriate information for use in estimating the location of the tracking device 102. For example, for at least some of the beacon signals received at the tracking device 102, the tracking device 102 could record an identifier for each beacon signal (such as the identifier of the beacon generator transmitting the beacon signal) and the transmit power level of the beacon signal (such as 0 dBm, −10 dBm, or −25 dBm). The tracking device 102 could also record the supply voltage level identified in the received beacon signal, which represents the supply voltage being used by the beacon generator to generate/transmit the beacon signal. In addition, the tracking device 102 could determine the signal strength of the received beacon signal. As a particular example, various IEEE 802.11 specifications provide techniques for generating a Received Signal Strength Indicator (RSSI) for a received radio signal. These or other or additional techniques could be used to determine the signal strength of a received wireless signal. In some embodiments, the phrase "signal strength" may represent a signal power level measured in units of dBm, although any suitable signal strength values may be used.

The information collected by the tracking device 102 can be used by the tracking device 102, the control unit 106, or other component to determine at least an estimated location (if not an actual location) of the tracking device 102. For example, in some embodiments, the control unit 106 may correlate the information associated with different beacon signals received by the tracking device 102 from different beacon generators 104a-104f, calculate a distance between the tracking device 102 and at least some of the beacon generators 104a-104f, and determine an estimated position of the tracking device 102 based on the distances. This process can be performed once or multiple times at any suitable constant or variable interval. In some embodiments, when there is more than one object to be tracked, each tracking device 102 may send information to the control unit 106 using an identifier that uniquely identifies the tracking device 102, which allows the control unit 106 to identify the location of individual tracking devices 102 in the system 100 using information from those individual tracking devices 102.

In some embodiments, the control unit 106 can be pre-programmed with the location of each beacon generator within a space being monitored. This allows the control unit 106 to translate information received from the tracking device 102 into a physical location. The control unit 106 may also maintain a continuous record of the estimated location(s) of the tracking device 102, such as by storing the locations in a persistent memory. From this record, the movement of an object being tracked over a period of time can be determined relatively accurately. In particular embodiments, the control unit 106 may store this information for later retrieval by users or other components in the system 100. The control unit 106 may provide this information to users in any reasonable form, such as via (i) a list of the start and end times of the tracked object in each of various rooms or (ii) a map showing a trail of the movement of the tracked object with or without time stamps. This information can be used in any suitable manner, such as to determine whether a person is moving about in a normal or expected fashion. It can also be used to determine if a person is going places within the space that he or she should not be.

In particular embodiments, ADEMCO technology developed by HONEYWELL INTERNATIONAL INC. can be used in the tracking system 100. This technology includes a radio chip set and products that incorporate the chip set in conjunction with sensors to form a wireless transceiver security system. This technology may be used in wireless security systems for use in home and business wireless security systems. This technology further includes wireless control panels, wireless detectors, and wireless remote transmitters that can be placed within key fobs, watches, jewelry, or other personal items for remotely enabling or disabling the security system.

As a specific implementation of the system 100, beacon generators 104a-104f could be distributed in different rooms of a house, such as in a garage, a kitchen, an entryway, a dining room, a living room, and multiple bedrooms. Each room may include a beacon generator, such as a beacon generator inserted into a smoke, fire, or carbon monoxide detector in the house. The control unit 106 may be positioned in one of the bedrooms or in a closet, such as near a wiring panel or security system controller. One or more tracking devices 102 may be carried by or otherwise associated with one or more people or other objects (such as valuable objects) to be monitored. In these embodiments, communications between all components in the system 100 may be wireless.

Although FIG. 1 illustrates one example of a location tracking system 100, various changes may be made to FIG. 1. For example, the functional division in FIG. 1 is for illustration only. Various components in FIG. 1 could be combined or omitted and additional components could be added according to particular needs. As a particular example, the functionality of the control unit 106 may be resident in any of the tracking device 102, the beacon generators 104a-104f, or a separate device as shown. As another particular example, a beacon generator and a receiver could be integrated into a single physical unit (such as a transceiver unit). Also, the system 100 could include any suitable number of tracking devices, beacon generators, control units, and receivers. In addition, FIG. 1 illustrates one operational environment in which the supply voltage level of a wireless signal transmitter is used to identify a location of an object. This functionality could be used in any other suitable system.

FIG. 2 illustrates an example tracking device 102 in a location tracking system according to one embodiment of this disclosure. The embodiment of the tracking device 102 shown in FIG. 2 is for illustration only. Other embodiments of the tracking device 102 could be used without departing from the scope of this disclosure. Also, for ease of explanation, the tracking device 102 in FIG. 2 is described as operating in the system 100 of FIG. 1. The tracking device 102 in FIG. 2 could be used in any suitable system.

As shown in FIG. 2, the tracking device 102 includes an antenna 202, receive circuitry 204, a controller 206, transmit circuitry 208, an antenna 210, and a power supply 212. The antenna 202 represents any suitable structure for receiving incoming wireless signals, such as an RF antenna for receiving RF beacon signals. The receive circuitry 204 processes the incoming signals, such as by down-converting an RF signal to an intermediate or baseband signal. The receive circuitry 204 could include any suitable structure for handling incoming wireless signals, such as one or more filters, amplifiers, and analog-to-digital converters. In this example, the receive circuitry 204 includes a signal strength indicator (SSI) unit 214, which can measure the signal strength of an incoming signal. The signal strength indicator unit 214 includes any suitable structure for measuring signal strengths, such as a component that generates RSSI values.

The controller 206 processes the received wireless signals. For example, the controller 206 could extract the beacon generator identifier, transmit power level, and supply voltage level from a received beacon signal. The controller 206 could store this information for later use, such as in a memory 214. The controller 206 could also use this type of information from multiple beacon generators to identify a location of the tracking device 102 and store this information for transmission, such as in the memory 214. The controller 206 includes any hardware, software, firmware, or combination thereof for extracting information from wireless signals and using the information to identify or facilitate identification of the tracking device's location. The memory 214 includes any suitable volatile and/or non-volatile storage and retrieval device or devices.

The controller 206 may provide information to be transmitted by the tracking device 102, such as information extracted from beacon signals, an identified location of the tracking device 102, or an identifier associated with the tracking device 102. The transmit circuitry 208 prepares information for transmission in outgoing signals, such as by up-converting the information for RF transmission. The transmit circuitry 208 could include any suitable structure for handling outgoing signals, such as one or more filters, amplifiers, and digital-to-analog converters. The antenna 210 represents any suitable structure for transmitting outgoing wireless signals, such as an RF antenna.

The receive circuitry 204, controller 206, and transmit circuitry 208 could be implemented in any suitable manner. For example, these components could be implemented using one or more ASICs, microprocessors, analog hardware, digital hardware, or any other suitable technology.

In this example, the power supply 212 provides operating power to the components of the tracking device 102. The power supply 212 represents any suitable source of operating power, such as a battery, fuel cell, solar cell, or other power source. As a particular example, the power supply 212 may represent a long-life, small, lightweight battery.

In one aspect of operation, the tracking device 102 may receive multiple beacon signals from multiple beacon generators 104a-104f. The beacon signals are received by the antenna 202 and provided to the receive circuitry 204. Among other things, the receive circuitry 204 measures the signal strength of at least some of the received beacon signals. Information associated with the received beacon signals, such as a beacon generator identifier, transmit power level, and received signal strength, is identified by the controller 206. This information could be provided to the transmit circuitry 208 (possibly after storage for a time in the memory 214), which prepares the information for transmission via the antenna 210. This information can also be used by the controller 206 to identify a location of the tracking device 102, and the identified location can be provided to the transmit circuitry 208 for transmission (possibly after storage for a time in the memory 214).

Although FIG. 2 illustrates one example of a tracking device 102 in a location tracking system, various changes may be made to FIG. 2. For example, the functional division shown in FIG. 2 is for illustration only. Various components in FIG. 2 could be combined or omitted and additional components could be added according to particular needs. As a particular example, while shown as using two separate antennas 202 and 210, a single antenna could be used and shared in the tracking device 102.

FIG. 3 illustrates an example beacon generator 104a in a location tracking system according to one embodiment of this disclosure. The embodiment of the beacon generator 104a shown in FIG. 3 is for illustration only. Other embodiments of the beacon generator 104a could be used without departing from the scope of this disclosure. Also, for ease of explanation, the beacon generator 104a in FIG. 3 is described as operating in the system 100 of FIG. 1. The beacon generator 104a in FIG. 3 could be used in any suitable system.

As shown in FIG. 3, the beacon generator 104a includes an antenna 302, transmit circuitry 304, and a controller 306. The antenna 302 represents any suitable structure for transmitting outgoing wireless signals, such as an RF antenna for transmitting RF beacon signals. The transmit circuitry 304 generates the outgoing wireless signals, such as by up-converting information to be transmitted in the outgoing wireless signals. The controller 306 may provide the information to the transmit circuitry 304 for transmission via the antenna 302. Information that can be included in the outgoing wireless signals could include a beacon generator identifier, a transmit power level, and a supply voltage level. The controller 306 includes any hardware, software, firmware, or combination thereof for controlling the generation of beacon signals by the beacon generator 104a.

The beacon generator 104a may also include receive circuitry 308 and an antenna 310. The antenna 310 could be used to receive signals (such as RF signals) from other components (such as the tracking device 102 or the control unit 106), and the receive circuitry 308 may process the received signals (such as by down-converting the signals). Similarly, the beacon generator 104a may include a wired network interface 312. The wired network interface 312 can be used to communicate with other components (such as the control unit 106) over a wired network. The network interface 312 could, for example, represent an Ethernet interface.

In this example, a power supply 314 provides operating power to various components of the beacon generator 104a. The power supply 312 represents any suitable source of operating power. For example, the power supply 312 could represent an internal power source, such as a long-life battery. The power supply 312 could also represent a source of power received externally, such as circuitry for receiving power through a wire normally used to provide power to a smoke, fire, carbon monoxide, or other detector.

As discussed above, the beacon generator 104a may include its supply voltage level in the beacon signals transmitted by the beacon generator 104a. This is because the strength of the beacon signals transmitted by the beacon generator 104a may vary as the voltage provided by the power supply 314 varies. For example, many RF radios are designed to operate at reduced power supply levels, but these RF radios typically transmit at lower output power levels during these times. Small changes in output power levels can be present even in RF radios that include voltage regulating circuitry. These changes in output power levels can result in significant errors in location tracking calculations. Adding circuitry to maintain a constant power supply voltage level can add significant expense to the RF radios. In accordance with this disclosure, a power supply monitor 316 monitors the voltage level provided by the power supply 314, and information associated with the monitored voltage level can be provided to the tracking device 102. The power supply monitor 316 includes any suitable structure for measuring, monitoring, or otherwise determining the voltage level provided by a power supply.

In one aspect of operation, the beacon generator 104a transmits beacon signals for use in determining the location of a tracking device 102. The transmitted beacon signals could contain or identify the beacon generator 104a, such as by containing a unique alphanumeric value or other identifier associated with the beacon generator 104a. The transmitted beacon signals could also contain or identify the transmit power level used to transmit the beacon signals, such as a value associated with a transmit power level of 0 dBm, −10 dBm, or −25 dBm. In addition, the power supply monitor 316 could measure the voltage level provided by the power supply 314 and provide a value indicative of the measured voltage level to the controller 306. The value could represent the actual voltage level provided by the power supply 314, a value identifying a range in which the actual voltage level falls, or other suitable indicator. The controller 306 could then include information associated with the voltage level provided by the power supply 314 in the transmitted beacon signals.

Although FIG. 3 illustrates one example of a beacon generator 104a in a location tracking system, various changes may be made to FIG. 3. For example, the functional division shown in FIG. 3 is for illustration only. Various components in FIG. 3 could be combined or omitted and additional components could be added according to particular needs. As a particular example, while shown as using multiple antennas, a single antenna could be used and shared in the beacon generator 104a. Also, various components in FIG. 3 could be optional depending on the configuration or operation of the beacon generator 104a. For instance, either the receive circuitry 308 or the network interface 312 could be omitted, depending on whether the beacon generator 104a receives data over a wireless or wired connection.

FIG. 4 illustrates an example control unit 106 in a location tracking system according to one embodiment of this disclosure. The embodiment of the control unit 106 shown in FIG. 4 is for illustration only. Other embodiments of the control unit 106 could be used without departing from the scope of this disclosure. Also, for ease of explanation, the control unit 106 in FIG. 4 is described as operating in the system 100 of FIG. 1. The control unit 106 in FIG. 4 could be used in any suitable system.

As shown in FIG. 4, the control unit 106 includes an antenna 402, receive circuitry 404, a controller 406, transmit circuitry 408, and an antenna 410. The antenna 402 represents any suitable structure for receiving incoming wireless signals, such as an RF antenna. The receive circuitry 404 processes the incoming signals, such as by down-converting an RF signal to an intermediate or baseband signal using one or more filters, amplifiers, and analog-to-digital converters. The controller 406 processes the received wireless signals and can perform a wide variety of functions as described below. The transmit circuitry 408 and the antenna 410 can be used to facilitate wireless transmissions, such as RF transmissions to the beacon generators 104a-104f, tracking device 102, or other components.

In this example, a memory 412 is coupled to the controller 406. The memory 412 can be used to store various information associated with the operation of the control unit 106. The memory 412 could, for example, store location information from the tracking device 102 so that the control unit 106 can reconstruct the movement of the tracking device 102 over time. This movement can then be processed to, for example, create a log or map of the movement of the tracking device 102. The memory 412 includes any suitable volatile and/or non-volatile storage and retrieval device or devices. The controller 406 includes any suitable hardware, software, firmware, or combination thereof for identifying a tracking device's location. The controller 406 could, for example, include a microprocessor, personal computer, ASIC, state machine, processor, combinational logic, digital signal processor, and/or other hardware, software, firmware, or combination thereof.

The controller 406 is also coupled to a display 414 and a network interface 416. The display 414 represents any suitable display device, such as an LCD display, CRT display, television, projector, or other device. The display 414 could also be used in any suitable manner, such as to present warning messages or movement maps to users. The network interface 416 could be used to communicate with other components over a wired network, such as the beacon generators 104a-104f or receiver 108. The network interface 416 could, for example, represent an Ethernet interface.

The controller 406 may perform various functions related to the tracking of the tracking device 102 in the system 100. For example, the controller 406 could receive information from the tracking device 102, where the information is associated with at least some of the beacon signals received by the tracking device 102. As a particular example, the controller 406 could receive information that includes beacon generator identifiers, transmit power levels, and supply voltage levels for each beacon signal received by the tracking device 102. The controller 406 could receive this information in any suitable manner, such as directly from the tracking device 102 (via wireless signals) or indirectly (such as via one or more beacon generators 104a-104f or receivers 108). The controller 406 could use this information to identify a location of the tracking device 102.

The controller 406 may also communicate with the beacon generators 104a-104f (such as via the receive circuitry 404, the transmit circuitry 408, or the network interface 416) to transmit information to or receive information from the beacon generators 104a-104f. Information sent to the beacon generators 104a-104f could include information controlling the transmission of beacon signals by the beacon generators 104a-104f. Information received from the beacon generators 104a-104f could include information received by the beacon generators 104a-104f from the tracking device 102.

In some embodiments, the controller 406 employs circuitry, an algorithm, or other suitable mechanism to identify the location of the tracking device 102. The controller 406 could, among other things, use the received signal strengths, transmit power levels, and supply voltage levels associated with beacon signals received by the tracking device 102 to identify the location of the tracking device 102. Consider, for example, the scenario depicted in FIG. 5. Here, three beacon generators are located at positions $(x_1, y_1)$, $(x_2, y_2)$, and $(x_3, y_3)$, respectively. Also, the tracking device 102 is located at position $(x_{TD}, y_{TD})$. The distance from the tracking device 102 to each of the three beacon generators is denoted $d_1$, $d_2$, and $d_3$, respectively.

Once the distances $d_1$, $d_2$, and $d_3$ are known, the position of the tracking device 102 can be determined with at least some degree of certainty. The identification of at least three distances and the determination of a position based on those determined distances may be referred to as triometric or multilateration calculations. In some embodiments, each of the distances $d_1$, $d_2$, and $d_3$ in FIG. 5 can be determined as a function of the received signal strength (such as RSSI) of the beacon signal from the respective beacon generator, the transmit power level used by the respective beacon generator, and the supply voltage level of the respective beacon generator. In other words, each distance $d_i$ can be expressed as:

$$d_i = f(RSSI_i, TxPower_i, Voltage_i) \qquad (1)$$

where $RSSI_i$ represents the received signal strength of a beacon signal, $TxPower_i$ represents the transmit power level used to transmit the beacon signal, and $Voltage_i$ represents the supply voltage level of the beacon generator. The $RSSI_i$ values can be measured, for example, at the tracking device 102. The transmit power level and the supply voltage level can be identified in a beacon signal and extracted by the tracking device 102. The control unit 106 could implement a distance-mapping function, such as in the controller 406, to determine three or more distances for each tracking device 102. Once these three or more distances are determined, the known locations of the beacon generators can be used along with the determined distances to identify the location of the tracking device 102.

Figure 6:
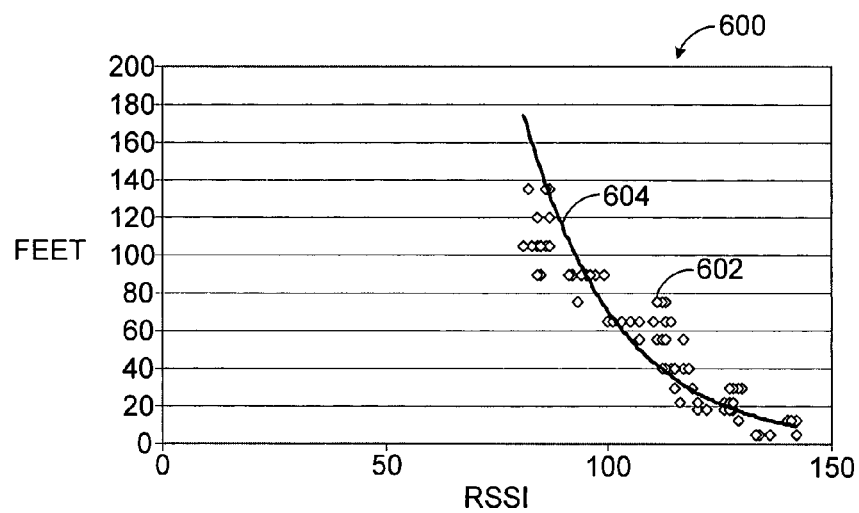
FIG. 6 illustrates an example graph showing estimated distances as a function of received signal power levels according to one embodiment of this disclosure.

The $RSSI_i$ value used in Equation (1) above may be related to distance in any suitable manner. For example, FIG. 6 illustrates an RSSI-distance map 600, which maps estimated distances as a function of RSSI levels. As shown in FIG. 6, weaker received signal strengths generally correspond to larger distances between the tracking device 102 and a beacon generator. In this example, multiple data points 602 can be determined using empirical measurements, and a solid line 604 represents extrapolated averages of the data points 602 in the range from approximately 80 feet to approximately 140 feet. The line 604 can be used by the control unit 106 to convert an RSSI value measured by the tracking device 102 into an estimated distance between the tracking device 102 and one of the beacon generators.

The transmit power level of a beacon generator can be used in any suitable manner along with the RSSI value. For example, the RSSI-distance map 600 shown in FIG. 6 could represent one distance map for a particular beacon generator transmitting at a particular transmit power level. The control unit 106 could have multiple RSSI-distance maps for each beacon generator, where each map corresponds to a different transmit power level of a beacon generator. The control unit 106 could receive a beacon generator identifier, an RSSI value, and a transmit power level from the tracking device 102. The control unit 106 could then select the appropriate distance map 600 using the beacon generator identifier and the transmit power level. After that, the control unit 106 could estimate a distance using the RSSI value and the selected distance map 600.

Similarly, the power supply voltage level of a beacon generator can be used in any suitable manner along with the RSSI value and transmit power level. For example, in some embodiments, the RSSI-distance map 600 shown in FIG. 6 could represent one distance map for a particular beacon generator transmitting at a particular transmit power level, where that beacon generator has a particular power supply voltage level (or a power supply voltage level that falls within a particular range). The control unit 106 could have multiple RSSI-distance maps for each transmit power level of the beacon generator, where each map corresponds to a different combination of transmit power level and power supply voltage level of the beacon generator. The control unit 106 could receive a beacon generator identifier, an RSSI value, a transmit power level, and a power supply voltage level from the tracking device 102. The control unit 106 may then select the appropriate distance map 600 using the beacon generator identifier, transmit power level, and power supply voltage level. After that, the control unit 106 may estimate a distance using the RSSI value and the selected distance map 600.

In other embodiments, multiple distance maps could be associated with different beacon generator-transmit power combinations, and the control unit 106 could select the appropriate distance map 600 using a beacon generator identifier and a transmit power level received from a tracking device 102. The control unit 106 could then modify the selected distance map 600 using a power supply voltage level received from the tracking device 102. For example, the control unit 106 could move the line 604 in the distance map 600 based on the power supply voltage level, such as by moving the line 604 in the distance map 600 down as the power supply voltage level of a beacon generator decreases over time. In this way, lower received signal strengths (caused by lower power supply voltage levels) may still correlate properly with distance from the beacon generator. In these embodiments, the amount of movement of the line 604 could be based on the amount of decrease in the power supply voltage level of the beacon generator. The amount of movement of the line 604 may also be determined in any suitable manner, such as by taking empirical measurements of the received signal strengths associated with the beacon generator at different power supply voltage levels and determining proper amounts of movements based on the empirical measurements.

In yet other particular embodiments, the $RSSI_i$ or other received signal strength values can be normalized using the power supply voltage levels of the beacon generators. This may involve determining the "normal" power supply voltage level for a beacon generator and then making adjustments to received signal strength values for signals from that beacon generator when the measured power supply voltage level falls below the "normal" power supply voltage level.

In still other particular embodiments, a graph 700 can be generated showing how the output power of a beacon generator varies as the power supply voltage level of the beacon generator varies. In this example, a change of approximately 0.7V in the power supply voltage level of a beacon generator can lead to a 0.09 dBm variation in the output power of the beacon generator. This graph 700 (or similar data) could be used to determine a compensation value that can be added to an RSSI value determined by the tracking device 102. The compensation value allows the power supply voltage level of a beacon generator to be used to modify the signal strength of a beacon signal from that beacon generator.

These examples illustrate various ways in which the power supply voltage level of a beacon generator could be used when determining a position of a tracking device 102. Any other suitable technique could be used to determine a position of the tracking device 102, and the power supply voltage levels could be used in any suitable manner in the selected technique(s).

In particular embodiments, the following equations can be used to facilitate location tracking for the tracking device 102. In this description, a two-dimensional space is assumed, which may be adequate for single-level houses or other structures. However, as discussed below, this same technique can be extended to three dimensions and can therefore be implemented in a multi-floor house or other structures.

In these particular embodiments, the estimated location of the tracking device 102 can be obtained by solving an optimization problem to minimize a sum of squared distance errors for all beacon signals received or measured by the tracking device 102 between (A) and (B). Here, (A) represents a predicted distance between each beacon generator and the tracking device 102, and (B) represents a distance between each beacon generator at a known location and the tracking device 102. The distance error and the minimization problem can be respectively expressed in Equations (2) and (3) as follows:

$$J_i = \sqrt{(X_i - X_{TD})^2 + (Y_i - Y_{TD})^2} - d_i \quad (2)$$

$$\min_{X_{TD}, Y_{TD}} \sum_{i=1}^{n} W_i J_i^2. \quad (3)$$

Here, i represents an index identifying one of the known locations of a particular beacon generator, and n represents the number of the known locations. As noted above, $X_{TD}$ and $Y_{TD}$ represent the estimated location of the tracking device 102, such as in Euclidian coordinates. $X_i$ and $Y_i$ represent the known location i of a particular beacon generator, such as in Euclidean coordinates. In addition, $d_i$ represents an estimated distance between the tracking device 102 and the known location i as a function of (i) a transmit power level of a beacon signal sent to the tracking device 102, (ii) a signal strength of the beacon signal at the tracking device 102, and (iii) a power supply voltage level of the beacon generator at the known location i.

In Equation (3), $W_i$ represents a weighting factor associated with each beacon signal received or measured by the tracking device 102. In some embodiments, when determining the location of the tracking device 102, a weighting factor can be assigned to each estimated distance $d_i$ (such as $d_1$-$d_3$). For example, an estimated distance that is determined using a beacon signal with a lower transmit power level can have a larger weight than an estimated distance determined using a beacon signal with a higher transmit power level. In other words, the value of $W_i$ may decrease as the transmit power level increases, which could help to overcome problems such as receiver saturation and multipath effects. In particular embodiments, the relationship of the weighting factor $W_i$, the transmit power level of a beacon generator at known location i, and the corresponding received signal strength of the beacon signal at the tracking device 102 can be expressed using one of the following formulas:

$$W_i = \frac{\text{received signal strength of beacon signal from generator } i}{\text{transmit power level of generator } i} \quad (4)$$

$$W_i = \exp\left(\frac{\text{received signal strength of beacon signal from generator } i}{\text{transmit power level of generator } i}\right) \quad (5)$$

$$W_i = \left(\frac{\text{received signal strength of beacon signal from generator } i}{\text{transmit power level of generator } i}\right)^p \quad (6)$$

where p is a real number. For Equation (6), the value of p may depend on the implementation. For example, p may equal two in order to provide a squared rate of weighting. However, when the wireless range decreases (such as within buildings or other structures) and/or where there is a lot of interference, the value of p may be chosen to be higher, such as three or four. The final estimated location of the tracking device 102 could represent the position ($X_{TD}$, $Y_{TD}$) that yields the smallest value in Equation (3).

As noted above, Equations (2) and (3) can be extended to three dimensions for a multi-level building or other environment in which a tracked object may change position in elevation. In these embodiments, the following equations can be used:

$$J_i = \sqrt{(X_i - X_{TD})^2 + (Y_i - Y_{TD})^2 + (Z_i - Z_{TD})^2} - d_i \quad (7)$$

$$\min_{X_{TD}, Y_{TD}, Z_{TD}} \sum_{i=1}^{n} W_i J_i^2 \quad (8)$$

where the position of the tracking device 102 is denoted ($X_{TD}$, $Y_{TD}$, $Z_{TD}$) in three-dimensional space.

Figure 7:
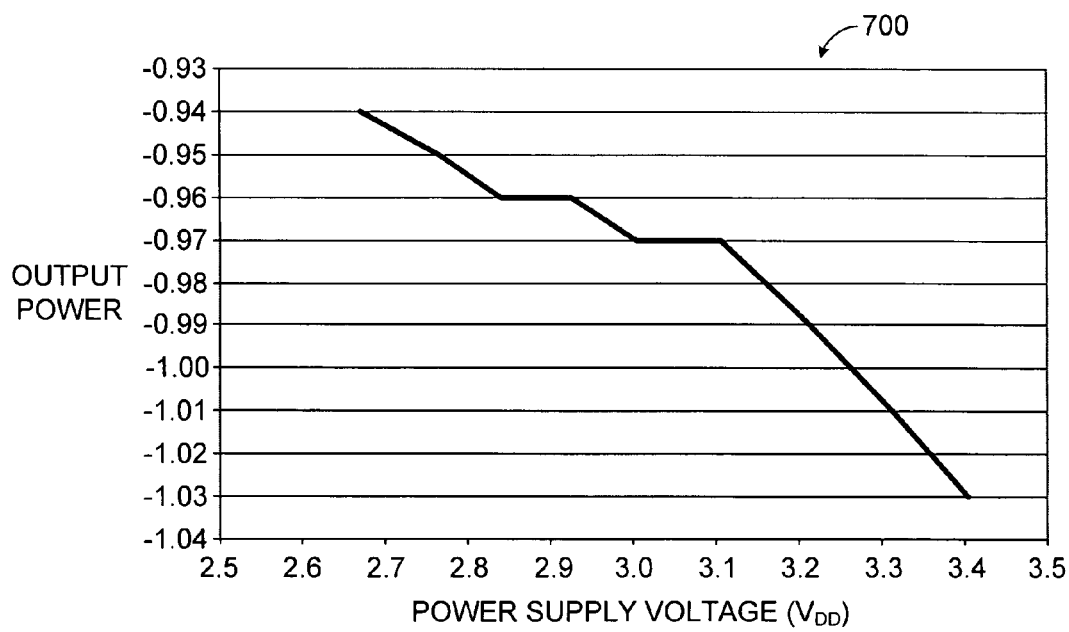
FIG. 7 illustrates an example graph showing changes in transmit output levels as a function of power supply voltage according to one embodiment of this disclosure.

Although FIG. 4 illustrates one example of a control unit 106 in a location tracking system, various changes may be made to FIG. 4. For example, the functional division shown in FIG. 4 is for illustration only. Various components in FIG. 4 could be combined or omitted and additional components could be added according to particular needs. As a particular example, while shown as using two separate antennas 402 and 410, a single antenna could be used and shared in the control unit 106. Also, the location tracking functionality described above could be performed by any suitable device. Further, various components shown in FIG. 4 could be optional depending on the configuration or operation of the control unit 106. For instance, the receive circuitry 404, the transmit circuitry 408, and/or the network interface 416 could be omitted, depending on whether the control unit 106 receives data over a wireless or wired connection. In addition, the scenario depicted in FIG. 5, the RSSI-distance map 600 in FIG. 6, and the power supply voltage level-output power level graph 700 in FIG. 7 are for illustration only. Any suitable number of beacon generators in any suitable configuration could be used. Also, any suitable RSSI-distance map, power supply voltage level-output power level relationship, or other relationship could be used to identify a location of the tracking device 102.

Figure 8:
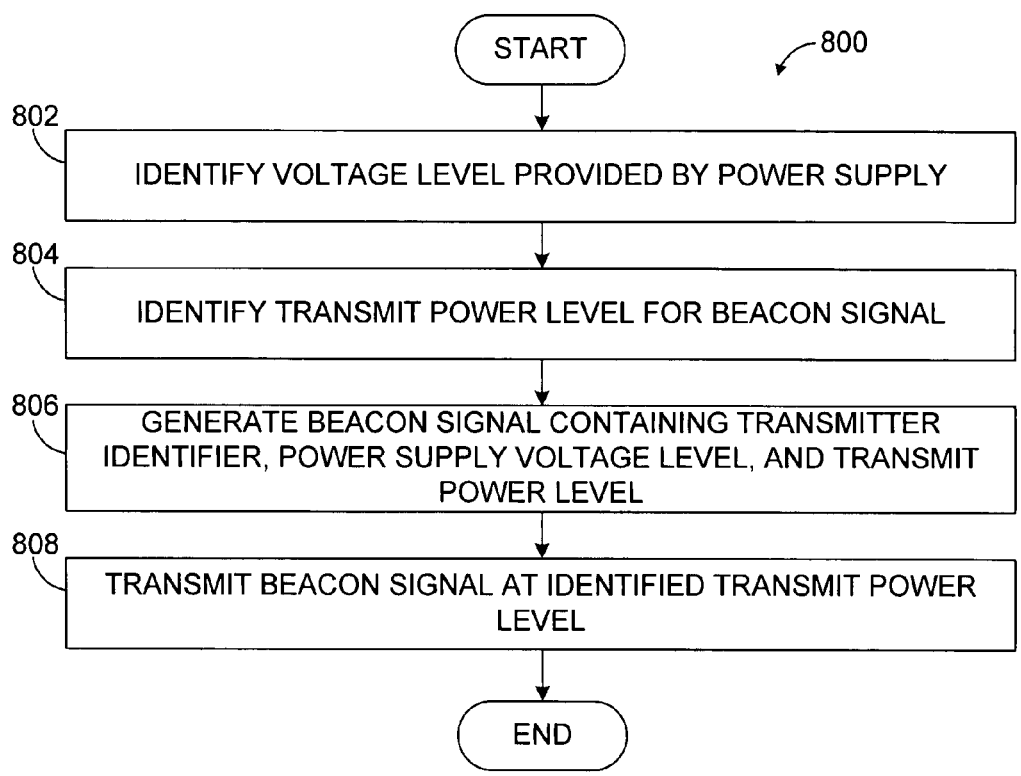
FIG. 8 illustrates an example method for providing a beacon signal for use in location tracking according to one embodiment of this disclosure.

FIG. 8 illustrates an example method 800 for providing a beacon signal for use in location tracking according to one embodiment of this disclosure. The embodiment of the method 800 shown in FIG. 8 is for illustration only. Other embodiments of the method 800 could be used without departing from the scope of this disclosure. Also, for ease of explanation, the method 800 is described with respect to the beacon generator 104a operating in the system 100 of FIG. 1. The method 800 could be used with any suitable device and in any suitable system, and/or various steps in FIG. 8 could be performed by components other than the beacon generator 104a.

A voltage level provided by a power supply in a wireless transmitter is identified at step 802. This could include, for example, the power supply monitor 316 identifying the voltage level provided by the power supply 314 in the beacon generator 104a. This may also include the power supply monitor 316 providing suitable information to the controller 306. For example, the power supply monitor 316 could output to the controller 306 the actual voltage level provided by the power supply 314 in the beacon generator 104a. The power supply monitor 316 could also output to the controller 306 a value indicative of a range in which the actual voltage level provided by the power supply 314 falls. The power supply monitor 316 could further output to the controller 306 a value near the actual voltage level provided by the power supply 314 falls. The power supply monitor 316 could provide any other or additional information during this step.

A transmit power level for a beacon signal is identified at step 804. This could include, for example, the controller 306 determining which of multiple transmit power levels to use when transmitting a beacon signal. The selected transmit power level could be chosen using any suitable criteria, such as control information received from the control unit 106.

A beacon signal containing an identifier for the wireless transmitter, the power supply voltage level, and the transmit power level is generated at step 806. This could include, for example, the controller 306 in the beacon generator 104a providing this information to the transmit circuitry 304 for placement onto an RF signal. The strength of the RF signal could be based on the identified transmit power level. The beacon signal is then transmitted at the desired transmit power level at step 808.

Although FIG. 8 illustrates one example of a method 800 for providing a beacon signal for use in location tracking, various changes may be made to FIG. 8. For example, while shown as a series of steps, various steps in FIG. 8 could overlap, occur in a different order, or occur multiple times. Also, it should be noted that the use of multiple transmit power levels at each beacon generator is not required. For instance, all beacon generators could have the same transmit power level, or individual beacon generators could have predetermined transmit power levels known to the control unit 106 or other component(s). In these embodiments, the selection of a transmit power level at step 804 could be omitted, and the transmit power level need not be included in the beacon signal at step 806.

Figure 9:
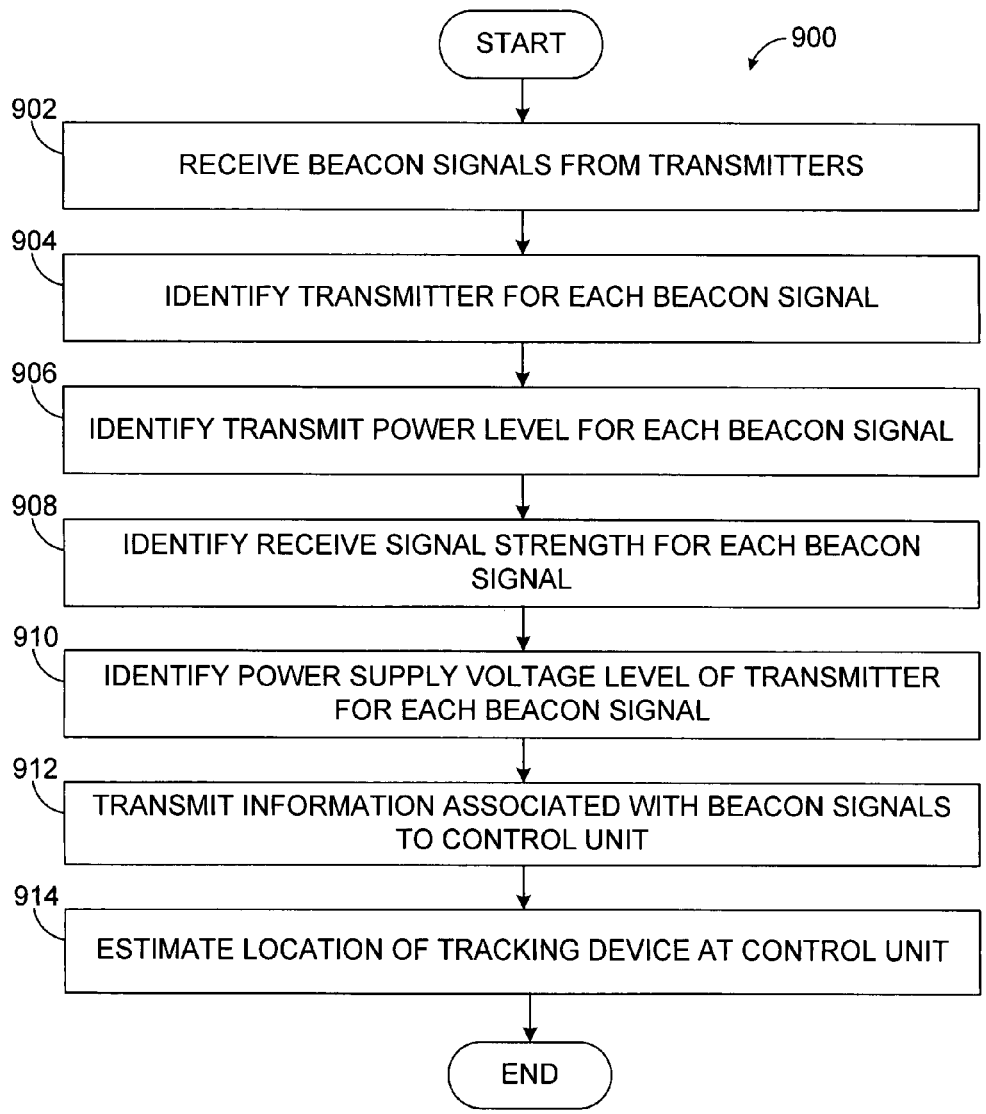
FIG. 9 illustrates an example method for using power supply voltage levels of signal transmitters during location tracking according to one embodiment of this disclosure.

FIG. 9 illustrates an example method 900 for using power supply voltage levels of signal transmitters during location tracking according to one embodiment of this disclosure. The embodiment of the method 900 shown in FIG. 9 is for illustration only. Other embodiments of the method 900 could be used without departing from the scope of this disclosure. Also, for ease of explanation, the method 900 is described with respect to the tracking device 102 and the control unit 106 operating in the system 100 of FIG. 1. The method 900 could be used with any suitable device(s) and in any suitable system, and/or various steps in FIG. 9 could be performed by components other than the tracking device 102 and the control unit 106.

A tracking device receives multiple beacon or other wireless signals from multiple wireless transmitters at step 902. This may include, for example, the tracking device 102 receiving multiple beacon signals from multiple beacon generators 104a-104f. In some embodiments, the tracking device 102 receives beacon signals from at least three beacon signal generators, which allows triometric or multilateration calculations of the position of the tracking device 102. The wireless signals could be received via the antenna 202 and provided to the receive circuitry 204.

The tracking device identifies a transmitter of each received beacon or other wireless signal at step 904. This may include, for example, the controller 206 in the tracking device 102 identifying the beacon generators that transmitted the received beacon signals using alphanumeric identifiers or other identifiers contained in or associated with the received beacon signals.

The tracking device identifies a transmit power level for each received beacon or other wireless signal at step 906. This may include, for example, the controller 206 in the tracking device 102 identifying the transmit power level for each received beacon signal using information contained in the received beacon signals.

The tracking device identifies a signal strength for each received beacon or other wireless signal at step 908. This may include, for example, the SSI unit 214 in the tracking device 102 generating an RSSI value for each of the received beacon signals. This could also include the controller 206 receiving the RSSI values from the SSI unit 214. Any suitable technique could be used to measure the signal strength of a received beacon signal or other wireless signal.

The tracking device identifies a power supply voltage level for each received beacon or other wireless signal at step 910. This may include, for example, the controller 206 in the tracking device 102 identifying the power supply voltage level for each received beacon signal using information contained in the received beacon signals.

The tracking device transmits information associated with the beacon signals at step 912. This may include, for example, the controller 206 providing the beacon generator identifiers, received signal strengths, transmit power levels, and power supply voltage levels to the transmit circuitry 208 for communication via the antenna 210.

A control unit estimates a location of the tracking device at step 914. This may include, for example, the control unit 106 receiving the transmitted information from the tracking device 102 via one or more of the beacon generators 104a-104f and/or one or more receivers 108. This may also include the controller 406 in the control unit 106 using the beacon generator identifier and transmit power level for each beacon signal received at the tracking device 102 to select an RSSI-distance map 600. This may further include the controller 406 taking the power supply voltage levels of the beacon generators into account. The power supply voltage levels could be used in any suitable manner, such as to modify selected RSSI-distance maps 600, select appropriate RSSI-distance maps 600, or normalize the received signal strengths of the beacon signals received at the tracking device 102. In addition, this may include the controller 406 using the received signal strengths (possibly modified or normalized) to estimate a distance using the appropriate RSSI-distance maps 600. In particular embodiments, the various equations shown and discussed above can be used to calculate the estimated location of the tracking device 102.

Although FIG. 9 illustrates one example of a method 900 for using power supply voltage levels of signal transmitters during location tracking, various changes may be made to FIG. 9. For example, while shown as a series of steps, various steps in FIG. 9 could overlap, occur in a different order, or occur multiple times. Also, it should be noted that the use of multiple transmit power levels at each beacon generator is not required, and the identification of the transmit power levels at step 906 could be omitted. In addition, the tracking device 102 or other component could determine its location rather than the control unit 106. The tracking device 102 could then use its determined location in any suitable manner, such as by transmitting its location to the control unit 106 or other component.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A method comprising: identifying a power supply voltage level provided by a power supply for a transmitter of a wireless signal; identifying a signal strength associated with the wireless signal; and determining at a controller a position of an object using the identified power supply voltage level and the identified signal strength.

2. The method of claim 1, further comprising receiving the wireless signal from the transmitter; wherein identifying the power supply voltage level comprises using information contained in the wireless signal; and wherein identifying the signal strength comprises measuring the signal strength of the wireless signal.

3. A method comprising: receiving a wireless signal from a transmitter; identifying a power supply voltage level associated with a power supply for the transmitter using information contained in the wireless signal; measuring a signal strength of the wireless signal; identifying a transmit power level associated with transmission of the wireless signal by the transmitter; and determining a position of an object using the power supply voltage level, the signal strength, and the transmit power level.

4. The method of claim 1, wherein determining the position of the object comprises using a signal strength-to-distance mapping that associates signal strength values and distances values.

5. The method of claim 4, further comprising selecting the signal strength-to-distance mapping from among a plurality of mappings based on the power supply voltage level.

6. The method of claim 4, further comprising modifying the signal strength-to-distance mapping based on the power supply voltage level.

7. The method of claim 4, further comprising modifying the identified signal strength based on the identified power supply voltage level; wherein determining the position of the object comprises using the modified signal strength and the signal strength-to-distance mapping.

8. The method of claim 7, wherein modifying the identified signal strength comprises adding a compensation value to the identified signal strength, the compensation value based on the identified power supply voltage level.

9. The method of claim 1, wherein a tracking device associated with the object determines the location of the object.

10. The method of claim 1, wherein: a controller determines the location of the object, the controller external to a tracking device associated with the object; and identifying the power supply voltage level and the signal strength comprise receiving information identifying the power supply voltage level and the signal strength from the tracking device.

11. The method of claim 1, wherein determining the position of the object comprises using signal strengths of multiple wireless signals and power supply voltages level associated with multiple transmitters.

12. An apparatus comprising: a memory configured to store: information identifying a power supply voltage level associated with provided by a power supply for a transmitter of a wireless signal; and information identifying a signal strength associated with the wireless signal; and a controller configured to determine a position of an object using the identified power supply voltage level and the identified signal strength.

13. The apparatus of claim 12, further comprising:
a wireless transceiver configured to receive the wireless signal from the transmitter; and
a signal strength unit configured to measure the signal strength of the wireless signal;
wherein the controller is configured to identify the power supply voltage level using information contained in the wireless signal.

14. The apparatus of claim 12, further comprising: at least one of a wireless transceiver and a wired network interface configured to receive the information identifying the power supply voltage level and the information identifying the signal strength.

15. An apparatus comprising: a memory configured to store: information identifying a power supply voltage level associated with a power supply for a transmitter of a wireless signal; information identifying a signal strength associated with the wireless signal; and information identifying a transmit power level associated with transmission of the wireless signal by the transmitter; and a controller configured to determine a position of an object using the power supply voltage level, the signal strength, and the transmit power level.

16. The apparatus of claim 12, wherein the controller is configured to determine the position of the object using a signal strength-to-distance mapping that associates signal strength values and distances values.

17. The apparatus of claim 16, wherein the controller is further configured to select the signal strength-to-distance mapping from among a plurality of mappings based on the power supply voltage level.

18. The apparatus of claim 16, wherein the controller is further configured to modify the signal strength-to-distance mapping based on the power supply voltage level.

19. The apparatus of claim 16, wherein: the controller is further configured to modify the identified signal strength based on the identified power supply voltage level; and the controller is configured to determine the position of the object using the modified signal strength and the signal strength-to-distance mapping.

20. A computer readable medium embodying a computer program, the computer program comprising computer readable program code for: identifying a power supply voltage level provided by a power supply for a transmitter of a wireless signal; identifying a signal strength associated with the wireless signal; and determining a position of an object using the identified power supply voltage level and the identified signal strength.

* * * * *